US009536169B2

United States Patent
Kobayashi

(10) Patent No.: US 9,536,169 B2
(45) Date of Patent: Jan. 3, 2017

(54) DETECTION APPARATUS, DETECTION METHOD, AND STORAGE MEDIUM

(71) Applicant: CANON KABUSHIKI KAISHA, Tokyo (JP)

(72) Inventor: Masaaki Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 14/306,486

(22) Filed: Jun. 17, 2014

(65) Prior Publication Data

US 2014/0376810 A1 Dec. 25, 2014

(30) Foreign Application Priority Data

Jun. 21, 2013 (JP) .................. 2013-131062

(51) Int. Cl.
*G06K 9/46* (2006.01)
*H04N 5/232* (2006.01)

(52) U.S. Cl.
CPC ........ *G06K 9/4604* (2013.01); *H04N 5/23229* (2013.01); *H04N 5/23254* (2013.01); *H04N 5/23277* (2013.01)

(58) Field of Classification Search
None
See application file for complete search history.

(56) References Cited

U.S. PATENT DOCUMENTS

| 2012/0027290 A1* | 2/2012 | Baheti ................. G06K 9/6857 382/154 |
| 2014/0301647 A1* | 10/2014 | Mase .................. G06K 9/4671 382/195 |

OTHER PUBLICATIONS

Allen, Sam. "C# Decrement Loop Optimization." C# Decrement Loop Optimization. Dot Net Perls, Aug. 4, 2009. Web. Feb. 3, 2016.*
Kanazawa, et al., "Detection of Feature Points for Computer Vision", Department of Information Technology, vol. 87, No. 12, 2004, pp. 1043-1048.
Rosten et al., "Machine Learning for High-Speed Corner Detection", Department of Engineering, Cambridge University, pp. 1-14.
Harris et al., "A Combined Corner and Edge Detector", Plessey Research Roke Manor, UK, 1988, pp. 147-151.
Tomasi et al., "Detection and Tracking of Point Features", Shape and Motion from Image Streams: A Factorization Method—Part 3, Technical Report CMU-CS-91-132, Apr. 1991, pp. 1-22.

(Continued)

*Primary Examiner* — Chan Park
*Assistant Examiner* — Geoffrey E Summers
(74) *Attorney, Agent, or Firm* — Carter, DeLuca, Farrell & Schmidt, LLP

(57) ABSTRACT

A detection apparatus that detects a feature point of an image, comprising: a conversion unit configured to convert a first image into a second image; a setting unit configured to set a first target number indicating the number of feature points to be detected from the first image and to set a second target number indicating the number of feature points to be detected from the second image based on the first target number and the number of feature points that are detected from the first image; and a processing unit configured to perform processing for detecting a feature point from the first image based on the first target number and processing for detecting a feature point from the second image based on the second target number.

19 Claims, 7 Drawing Sheets

(56) References Cited

OTHER PUBLICATIONS

Shi et al., "Good Features to Track", IEEE Conference on Computer Vision and Pattern Recognition (CVPR94) Seattle, Jun. 1994, pp. 1-8.
Chabat et al., "A Corner Orientation Detector", Image and Vision Computing 17 (1999), pp. 761-769.

* cited by examiner

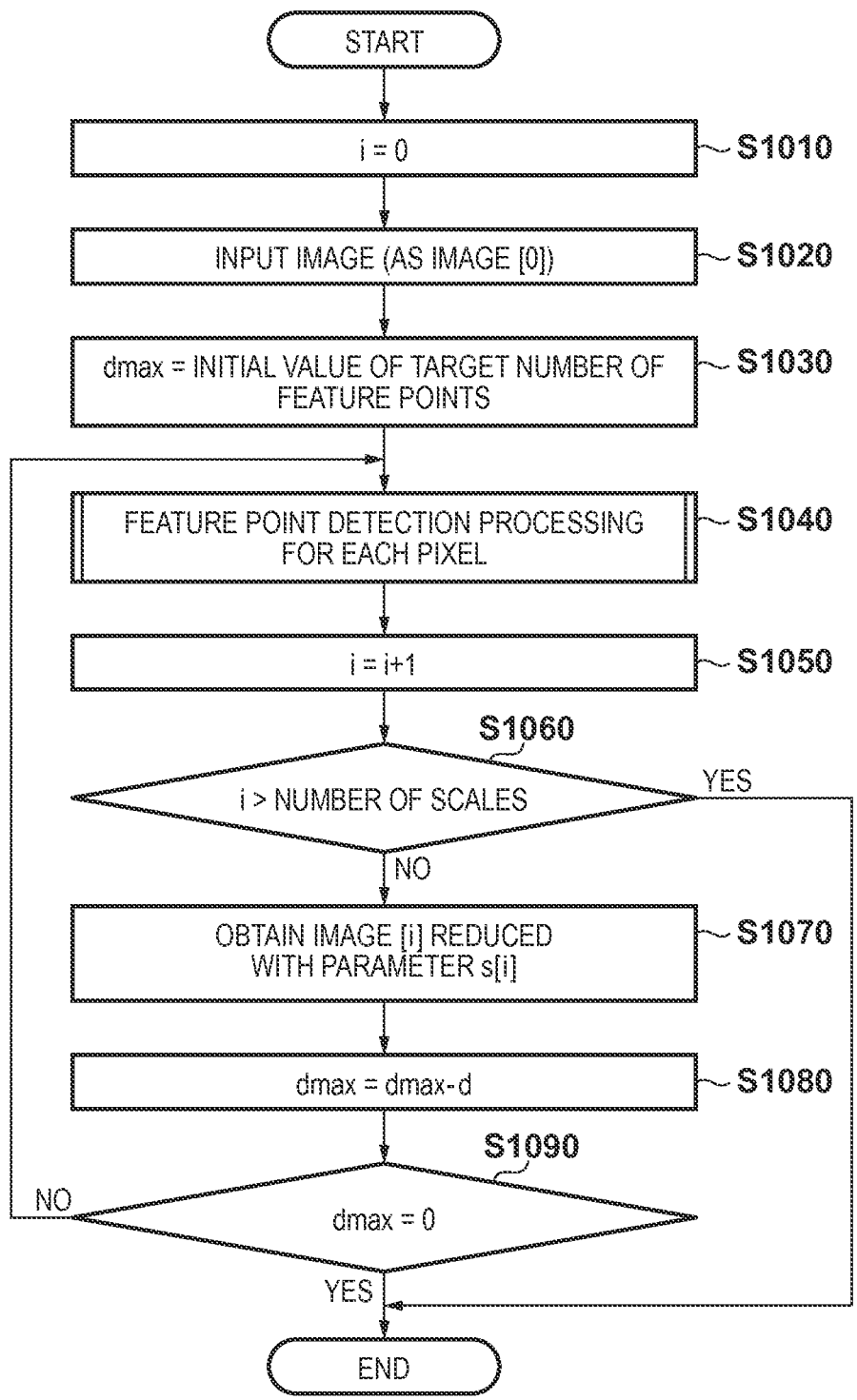

F I G. 4

| j | x-COORDINATE | y-COORDINATE | SCORE |
|---|---|---|---|
| 0 | 10 | 11 | 10 |
| 1 | 15 | 12 | 50 |
| 2 | 18 | 19 | 25 |
| 3 | 32 | 18 | 25 |
| . | . | . | . |
| . | . | . | . |
| . | . | . | . |

| SCALE VALUE | 1 | 1/4 | 1/16 | 1/256 | TOTAL |
|---|---|---|---|---|---|
| INITIAL VALUE | 1000 | – | – | – | – |
| TARGET NUMBER | – | 902 | 452 | 71 | – |
| DETECTION NUMBER | 98 | 450 | 381 | 71 | 1000 |

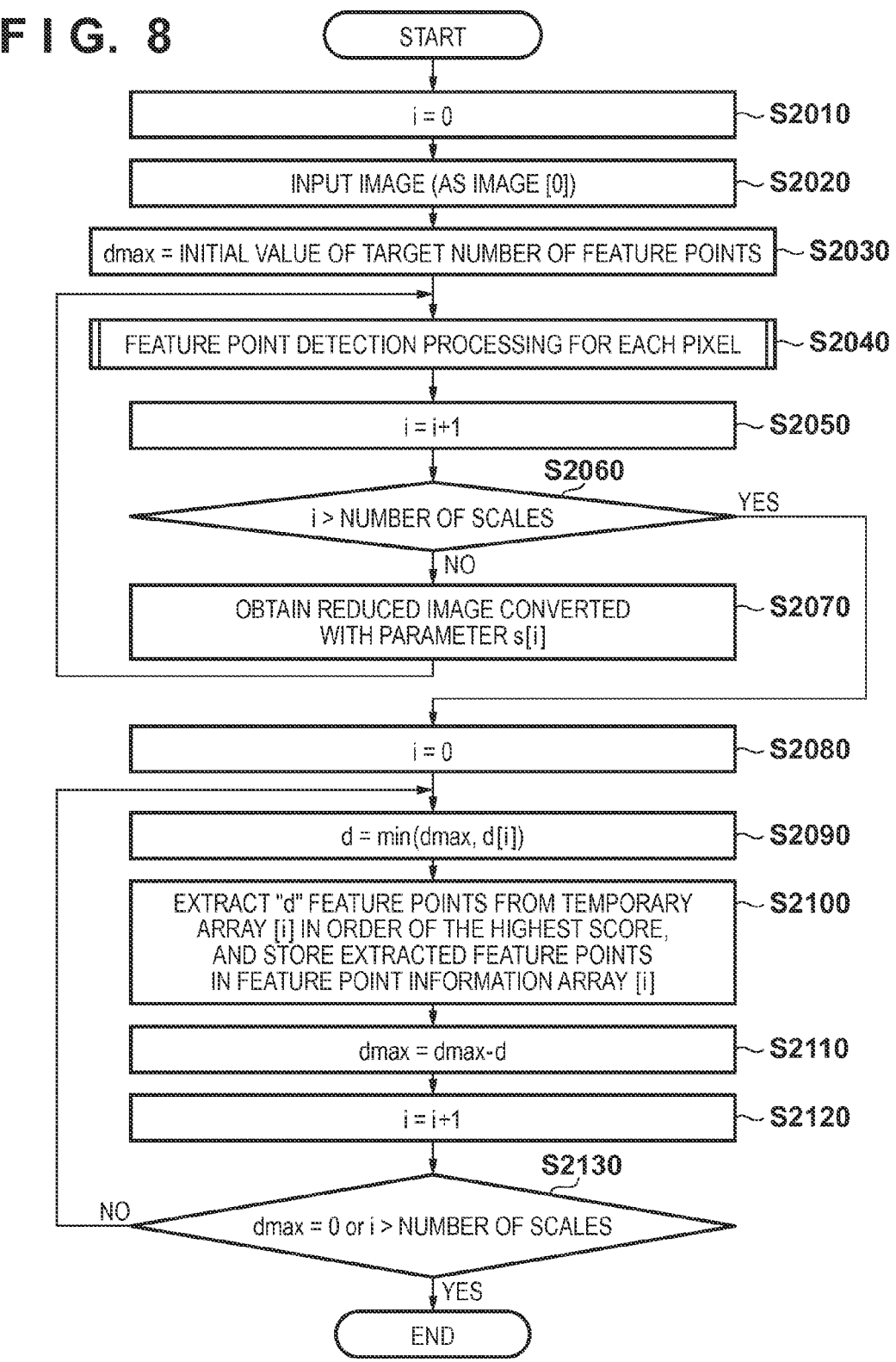

DETECTION APPARATUS, DETECTION METHOD, AND STORAGE MEDIUM

BACKGROUND OF THE INVENTION

1. Field of the Invention

The present invention relates to a detection apparatus that detects a feature point of an image, a detection method, and a storage medium.

2. Description of the Related Art

In the field of computer vision, there is a process called feature point detection (or feature point extraction). Feature point detection refers to a process for detecting points on an image that is obtained by imaging an object at which points the object can be conspicuously detected as feature points. According to Yasushi Kanazawa and Kenichi Kanatani, "Detection of Feature Points for Computer Vision", The Journal of Institute of Electronics, Information, and Communication Engineers, Vol. 87, No. 12, pp. 1043-1048, 2004, there are a wide variety of feature point detection methods including the Harris operator.

Feature point detection has, for example, the following applications. Feature points are detected from successive images, and feature amounts of these feature points are calculated. Furthermore, if the feature amount of a feature point in an image has the highest similarities to the feature amount of a feature point in another image, and those feature points are associated with each other, the relative position between those feature points can be regarded as the moving amount of a feature point. From this moving amount, a movement of an object or the entire image in which this feature point is contained can be obtained. For example, if a movement caused by camera shake is contained in an image, camera shake correction processing can be performed by performing geometric conversion in such a manner that the moving amount is corrected.

Also, if feature points are detected from a stereo image that is composed of two right and left images, the depth of a feature point can be estimated using the principle of triangulation based on the relative position between feature points detected from the respective images and associated with each other. That is to say, a three-dimensional image can be created from a stereo image.

Feature point detection has various other applications including image retrieval, image recognition, etc.

When feature points are to be detected from an image, such as an image with a shallow depth of focus and a wide out-of-focus area, from which it is difficult to detect feature points, there are cases where a set target number of feature points cannot be detected. Thus, conventional configurations in which feature point detection is performed had the problem of a decrease in the performance of processing, such as shake correction processing, that is executed using the results of the obtained feature points.

The present invention provides a technology for detecting a sufficient number of feature points accurately with a small processing load.

SUMMARY OF THE INVENTION

According to one aspect of the present invention, there is provided a detection apparatus that detects a feature point of an image, comprising: a conversion unit configured to convert a first image into a second image; a setting unit configured to set a first target number indicating the number of feature points to be detected from the first image and to set a second target number indicating the number of feature points to be detected from the second image based on the first target number and the number of feature points that are detected from the first image; and a processing unit configured to perform processing for detecting a feature point from the first image based on the first target number and processing for detecting a feature point from the second image based on the second target number.

Further features of the present invention will become apparent from the following description of exemplary embodiments with reference to the attached drawings.

BRIEF DESCRIPTION OF THE DRAWINGS

FIG. 2 is a flow diagram for explaining a procedure of feature point detection processing.

FIG. 4 is a table for explaining an example of the format of a variable-length array of feature point information with respect to each image.

FIG. 8 is a flow diagram for explaining a procedure of feature point detection processing.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

In feature point detection processing of a first embodiment of the present invention, setting of a target value, detection of feature points from a captured image, conversion of the image into a converted image, setting of a new target value based on the number of detected feature points and the target value, and detection of feature points from the converted image are recursively repeated. Thus, as compared with a method in which, for example, the size of a filter for use in feature point detection is increased in order to obtain a predetermined number of feature points from a captured image with a wide out-of-focus area, a sufficient number of feature points can be accurately detected with a smaller processing load.

Configuration of PC

Figure 1A:
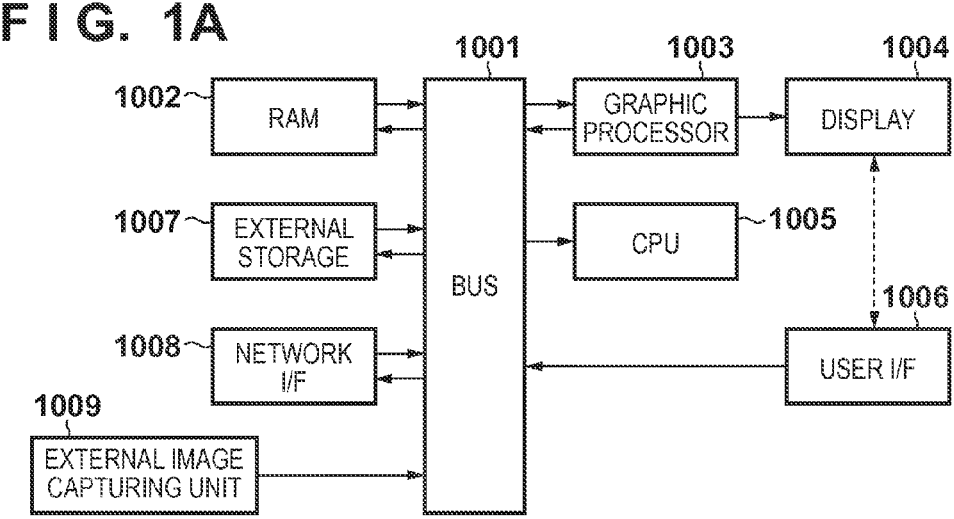
FIGS. 1A and 1B are diagrams for explaining the configuration of an apparatus that executes feature point detection processing.

In this embodiment, within a PC (personal computer) serving as an information processing apparatus to which a display (display apparatus) is connected, a CPU (central processing unit) performs various types of processing for analyzing a captured image and detecting feature points. Hereinafter, the configuration of the PC and the operation of various modules will be described with reference to FIG. 1A. FIG. 1A is a diagram for explaining the internal configuration of the PC.

A bus 1001 controls the data flow within the PC. A RAM (writable memory) 1002 functions as a work area etc. of the CPU. A graphic processor 1003 performs computing that is necessary in displaying an image on a display. A display 1004 is a display apparatus that displays a command input from a user I/F and a response output etc. of the PC with respect to the input command. A CPU 1005 controls the overall operation of the PC in cooperation with other components based on a computer program such as an operating system (OS) and an application program.

A user I/F 1006 accepts a user instruction and a command as input. In this embodiment, the user I/F is attained by a touch screen, but the present invention is not limited to this, and the user I/F may also be, for example, a keyboard, a pointing device, etc. An external nonvolatile storage 1007 functions as a bulk memory. In this embodiment, this is attained by a hard disk apparatus (hereinafter referred to as an HD), but other storage methods such as SSD may also be used. A network I/F 1008 relays data between the PC and an external apparatus. An external image capturing unit 1009 such as a camera images an object and obtains a captured image.

In this embodiment, programs and data to be executed are recorded in the external storage 1007, and these are input to the RAM 1002 and executed and processed by the CPU 1005. The programs and data are input/output to/from the components via the bus 1001. Unless otherwise described, image data is loaded from the external storage 1007 and converted into an internal image format. However, images can also input from the external image capturing unit 1009 or the network I/F 1008.

Internal images to be handled in feature point detection of this embodiment are images in an 8-bit format composed only of luminance component. An UI (user interface) screen and a processed image result can be displayed on the display 1004 via the graphic processor 1003. The graphic processor can perform geometric conversion of an input image, and can also store the converted image into the RAM 1002 or output the converted image directly to the display 1004. The user I/F 1006 can input information on whether or not any coordinate position on the display 1004 is touched. Processed data is recorded in the external storage 1007 or stored in the RAM 1002, and can be shared with other programs.

It should be noted that in this embodiment, an example in which the information processing apparatus that performs feature point detection processing is attained by a PC is described, but the present invention is not limited to this. The feature point detection processing according to this embodiment can be realized with the use of various types of information devices that perform information processing, such as a camera apparatus, an embedded system, a tablet terminal, a smartphone, etc. An example in which a camera apparatus is used as the information processing apparatus will be described later.

Feature Point Detection Processing

In this embodiment, a series of processing steps are recursively repeated until the sum total number of detected feature points reaches an initial target number. The series of processing steps include (1) feature point detection from an image with the objective of detecting a determined number of feature points, (2) image conversion, and (3) determination of a new target number of feature points. Then, detection of feature points from a converted image is performed with the objective of detecting the determined new target number of feature points. In this embodiment, the target number is set to a variable dmax.

Hereinafter, a specific operation of the feature point detection processing to be executed by the PC will be described with reference to FIG. 2. FIG. 2 is a flow diagram for explaining the overall procedure of feature point detection processing according to this embodiment. It should be noted that unless otherwise described, individual steps are executed in the order of step numbers. However, independent processing steps that have no dependence on each other are not required to be executed in the order of step numbers, and can also be executed in a rearranged order.

In this embodiment, reduced images are generated from an input image with the following scaling factor parameters:

$s[1]=\frac{1}{4}$, $s[2]=\frac{1}{16}$, and $s[3]=\frac{1}{256}$, respectively, and processing is performed will be described. That is to say, multi-scale processing is performed with the four scales (original-size image, $\frac{1}{4}$ image, $\frac{1}{16}$ image, and $\frac{1}{256}$ image) including the original-size input image.

It should be noted that the number of scales (here, the number of scales=4) and the scaling factors are not limited to those described above.

In step S1010, a control variable "i" is initialized to 0. In step S1020, an image serving as a feature point detection target is input. In the following description, the input image is referred to as the image [0].

In step S1030, a target number of feature points to be detected is set to the variable dmax. The target number varies depending on the image size and the application of feature point detection, but may be a fixed value or a value that is determined based on the image size etc. With regard to the method for determining the target number based on the image size, for example, when the image size is indicated in the number of pixels, the target number can be determined using an equation dmax=(k/100)×size, where "size" is the number of pixels, and the detection target is k % of the image size. In the following description of this embodiment, it is assumed that k=0.05. The variable dmax is stored in the RAM 1002.

Figure 3:
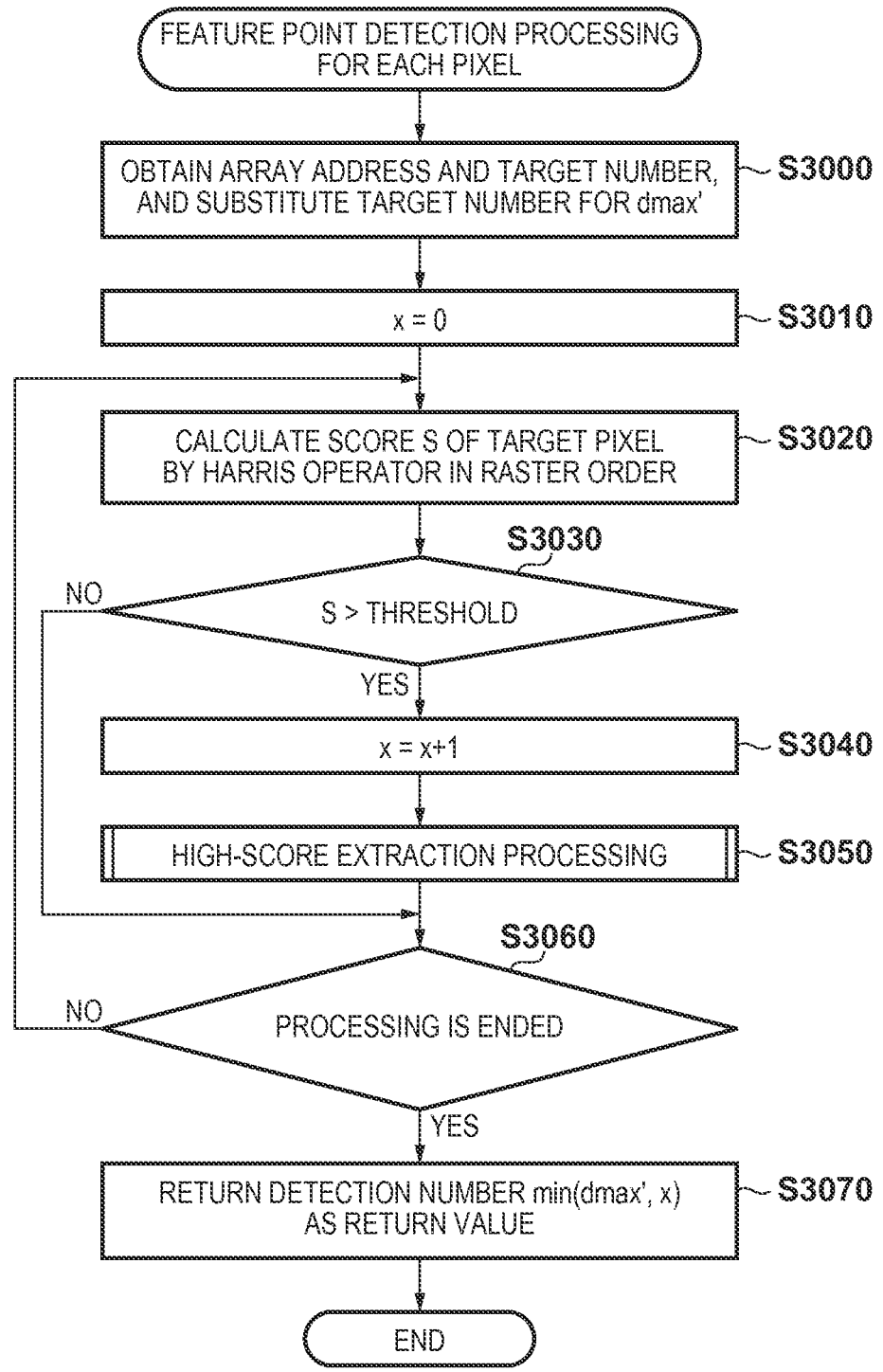
FIG. 3 is a flow diagram for explaining feature point detection processing for each pixel.

In step S1040, with respect to an image [i], feature point detection processing for each pixel is executed as a subroutine in accordance with the flow illustrated in FIG. 3, and feature points are detected, where dmax is the target number. In feature point detection processing for each pixel, a score is calculated for each pixel of the processing target image, and a pixel whose score value is larger than a predetermined threshold is detected as a feature point. Here, the score (score information) according to this embodiment is a value indicating the likelihood of a pixel constituting the processing target image being a feature point, and calculated for each pixel by a known feature point detection algorithm. In this embodiment, the larger the score, the more likely the pixel is to be a feature point. However, depending on the method for calculating the score, there may be a case where the smaller the score, the more likely the pixel is to be a feature point. The method of this embodiment is applicable to both cases.

In this embodiment, information on a single detected feature point is expressed as a structure containing the coordinates of that feature point and the score, and this structure is referred to as feature point information. The feature point information is stored in a two-dimensional feature point information array having the feature point information as its element. Specifically, a set of feature point information regarding an image [i] is stored in a feature point information array [i]. The feature point information array [i] itself is configured as a one-dimensional variable-length array, and in this embodiment, since the number of scales is 4, four variable-length arrays are present. The number of elements in a variable-length array is 0 in an initial state, and the same number of elements as the number of feature points detected from the image [i] are added to the feature point information array [i]. For example, when the index of an element is "j", the feature point information on that element can be accessed by referencing [j] in the feature point information array [i].

Next, the format of the variable-length array will be described. FIG. 4 is a table for explaining an example of the format of the variable-length array storing feature point information with respect to each image. In FIG. 4, a single raw indicates a single element, that is, feature point information in the variable-length array. In FIG. 4, "x-coordinate" and the "y-coordinate" are the coordinates indicating the position of a feature point in an image, and "score" is a value indicating the likelihood of a pixel being a feature point.

To perform feature point detection processing for each pixel illustrated as a subroutine in FIG. 3, the address of the feature point information array [i] and dmax, which is the target number, are set. The result of an addition/change made to a feature point information array that is shared by receiving the address can be shared with this flow and other programs. Also, the number of feature points detected in feature point detection processing for each pixel is received as a return value and substituted for a variable "d". The details of feature point detection processing for each pixel will be described later.

In step S1050, the control variable "i" is incremented by 1. In step S1060, it is judged whether or not the control variable "i" is larger than the number of scales (4 in the above-described example). If "i" is larger than the number of scales (YES in step S1060), this flow is ended, and if not (No in step S1060), the flow proceeds to step S1070. Here, in step S1050, it is judged whether "i" is larger than 4, which is the number of scales. When feature point detection processing with respect to an image [3] has been performed in step S1040, and the control variable "i" has been incremented to 4 in step S1050, the result of judgement in step S1050 is YES.

In step S1070, an image that has been reduced with a scaling factor parameter s[i] is obtained. In the following description, an image that has been converted with a parameter s[i] will be referred to as the image [i]. There is no limitation on the obtaining method, and a reduced image may be generated in this step, or a reduced image that has been already generated may be input.

For example, if i=1, the scaling factor parameter s[1]=¼, and therefore an image obtained by reducing the image [0] such that the width and the height of the image [0] are reduced to half so as to achieve an area ratio of ¼ is obtained. "i" is initialized to 0 in step S1010, and feature point detection processing for each pixel with respect to the input image [0] is performed in step S1040. Then, in step S1050, "i" is incremented to 2, and in S1070, an image [1] that has been reduced with the scaling factor parameter s[1]=¼ is obtained.

In step S1080, dmax−d is computed and substituted for dmax. This dmax is stored in the RAM 1002. The new dmax value is used in judgment of whether the loop is ended and in the next loop process. Here, "d" is the number of feature points detected in feature point detection processing. In step S1090, it is judged whether or not dmax is 0. If dmax is 0 (YES in step S1090), the processing is ended, and if dmax is not 0 (No in step S1090), the processing proceeds to step S1040. In this manner, the loop process is executed with respect to a plurality of reduced images, and thus feature point detection by multi-scale processing is executed. It should be noted that the processing in steps S1080 and S1090 may also be performed between steps S1040 and S1050 to judge whether feature point detection processing is ended.

Feature Point Detection for Each Pixel

Next, feature point detection processing for each pixel that is executed in step S1040 of FIG. 2 will be described with reference to FIG. 3. FIG. 3 is a flow diagram illustrating a procedure of feature point detection processing for each pixel. In feature point detection processing for each pixel, the score is calculated for each pixel of the processing target image, and the same number of pixels as the target value are detected as feature points from pixels whose scores are larger than a predetermined threshold or in the order of the highest score. It should be noted that although this embodiment is described assuming that the larger the score, the more likely the pixel is to be a feature point, there also are cases where the smaller the score, the more likely the pixel is to be a feature point, depending on the method for calculating the score. In these cases, feature points having low scores can be extracted instead of extracting feature points having high scores.

In step S3000, the array address and the target number with respect to feature points are received from the caller of the subroutine, and the target number is substituted for dmax'. dmax' is stored in the RAM 1002. In step S3010, a control variable "x" is initialized to 0. In step S3020, the score S of a target pixel is calculated by the Harris operator. This step is repeatedly executed, and a target pixel is set each time this step is executed, where the pixels are scanned in a raster order.

In step S3030, the score S and the predetermined threshold are compared in terms of magnitude. If S is larger than the threshold (YES in step S3030), the subroutine proceeds to step S3040, and if S is smaller than or equal to the threshold (No in step S3030), the subroutine proceeds to step S3060. In this embodiment, the threshold is described as a constant, but the threshold may also be a variable that can be set externally. The threshold is stored in the external storage 1007 or the RAM 1002.

Figure 5:
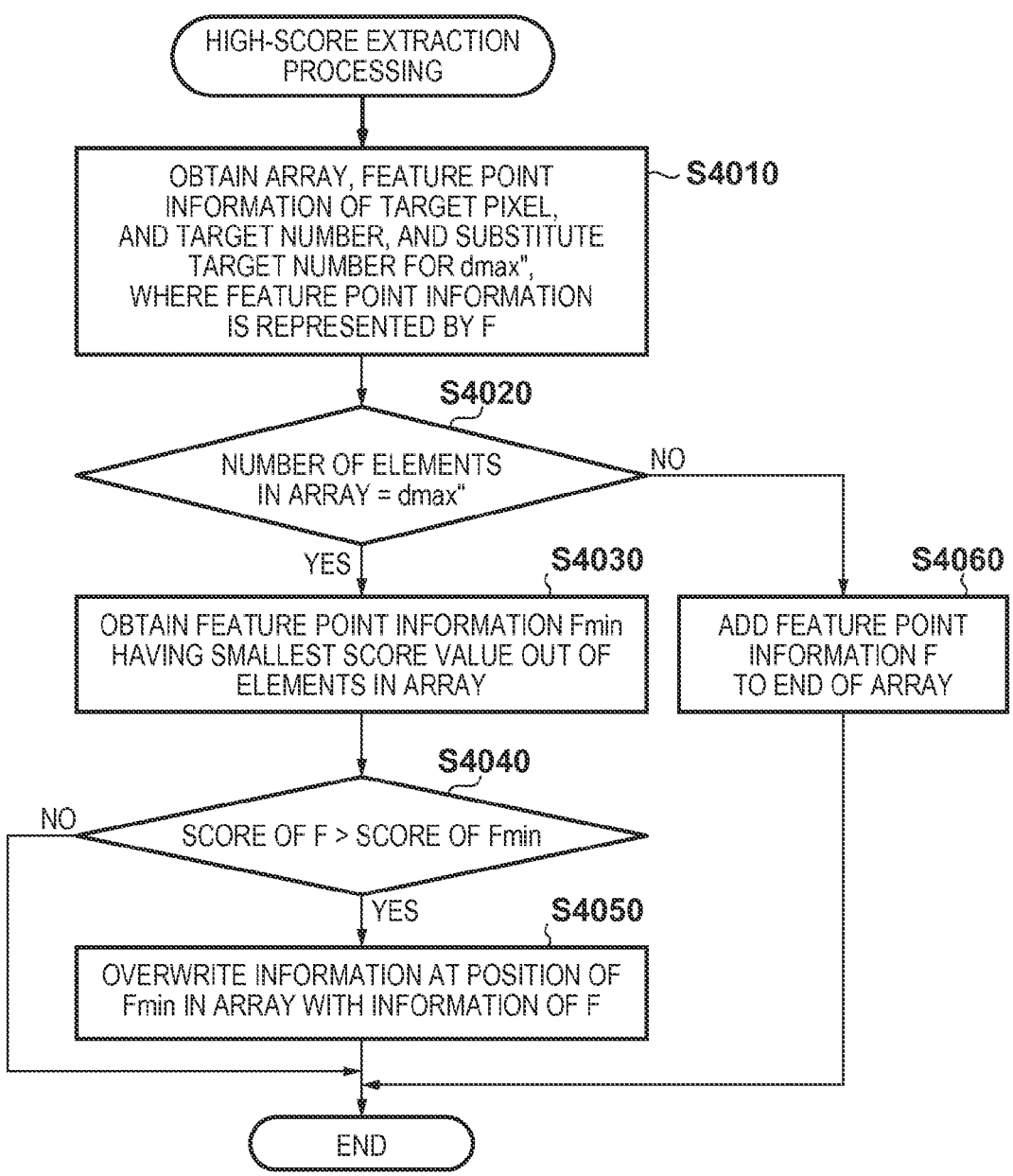
FIG. 5 is a flow diagram for explaining high-score extraction processing.

In step S3040, "x" is incremented by 1. In step S3050, high-score extraction processing is performed in which the address of the array, the feature point information of the target pixel, and dmax', which is the target number, are input, and a subroutine of a flow illustrated in FIG. 5 is executed. In high-score extraction processing, if the number of detected feature points is larger than dmax', dmax' feature points are detected as feature points from the detected feature points in the order of the highest score. The details of high-score extraction processing will be described later with reference to FIG. 5. In step S3060, it is judged whether processing with respect to all of the pixels within the image is ended. If the processing is ended (YES in step S3060), the subroutine proceeds to step S3070, and if not (No in step S3060), the subroutine proceeds to step S3020.

In step S3070, the subroutine returns the result of computing min(dmax', x) to its caller (i.e., step S1040 in FIG. 2) as a return value. A function min(x, y) compares the two arguments "x" and "y" in terms of magnitude and returns the smaller value. Since high-score extraction processing limits the number of feature points to be detected to dmax', the number of actually detected feature points does not exceed dmax'. dmax' is the target number, and "x" is the number of pixels whose scores S are larger than the threshold.

High-Score Extraction Processing

Next, high-score extraction processing that is executed in step S3050 of FIG. 3 will be described with reference to the flow in FIG. 5. FIG. 5 is a flow diagram for explaining high-score extraction processing.

In step S4010, the address of the feature point information array, the feature point information of the target pixel, and the target number are received from the caller of the subroutine, and the received target number is substituted for dmax", where the feature point information is represented by F. dmax" is stored in the RAM 1002.

In step S4020, the number of elements in the array and dmax" are compared in terms of magnitude. If the number of elements is equal to dmax" (YES in step S4020), the subroutine proceeds to step S4030, and if not (No in step S4020), the subroutine proceeds to step S4060. The array is stored in the RAM 1002.

In step S4030, feature point information having the smallest score value is searched for among the elements in the array and obtained as Fmin. In step S4040, the score of the feature point information F of the target pixel and the score of the element Fmin with the smallest score in the array are compared in terms of magnitude. If the score of F is the larger (YES in step S4040), the subroutine proceeds to step S4050, and if not (No in step S4040), the processing is ended. In step S4050, the information at the position of Fmin in the array is overwritten with the feature point information F, and high-score extraction processing is ended.

In step S4060, F is added to the end of the array, and high-score extraction processing is ended. In this manner, the smallest score value is searched for, and that element is replaced one after another. Consequently, feature point information with high scores is stored in the array.

If there is no limitation on the feature points to be detected, the processing amounts of other programs that use the feature points increase. Therefore, it is important to set the detection target number and suppress the number of feature points to be detected to that target number or less. However, conversely, if a required number of feature points to be detected cannot be obtained, the accuracy of processing results of the other programs that use the feature points decreases. According to this embodiment, only if a sufficient number of feature points cannot be detected from the input image, detection of feature points from a reduced image is performed, and thus a number of feature points that is close to the preset target number of feature points can be detected.

Figures 6, 7:
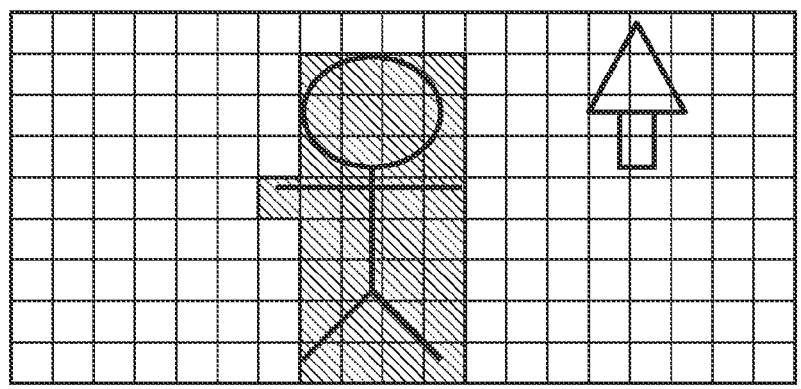
FIG. 6 is a table illustrating an example of actual feature point detection and target number computation.
FIG. 7 is a diagram for explaining an example of image division.

An example of such a case will be described with reference to FIG. 6. FIG. 6 illustrates an example of the actual feature point detection and the target number computation. In this example, it is assumed that the target number of feature points to be detected from an image is 1000. If 98 feature points are detected from an original-size image, 902, which is the result of computing 1000–98, is the target number of feature point detection with respect to an image at the next scale. Similarly, setting of a target number with respect to an image at each scale based on the difference between the target number and the number of detected feature points is repeated. Thus, feature points can be found in the images at the respective scales, and therefore a total of 1000 feature points can be found. FIG. 6 also shows that if feature points are detected exclusively from the original-size image, only 98 feature points can be detected.

Next, a comparison between the present method and other methods will be described. An example of the cases where a sufficient number of feature points cannot be detected is a case where the image has a shallow depth of focus and a wide out-of-focus area, that is, a case where the image is blurred. In order to detect feature points from an image that is blurred as described above (hereinafter referred to as "blurred image"), for example, the size of a filter for use in feature point detection is increased. However, this method leads to an increase in processing amount, which is a significant drawback.

The present method, even when using a relatively small and fixed size filter, enables detection of feature points from a blurred image by using the reduction processing together with the filter. Also, the present method can also deal with an image that is blurred to different extents by successively repeating the above-described processing while obtaining reduced images at smaller scales.

Other Configurations

In the foregoing description of this embodiment, it is assumed that the processing flow is applied to the entire image; however, the present invention is not limited to this. For example, as shown in FIG. 7, a configuration may be adopted in which an image is divided in a grid pattern to generate divided images, and for each divided image, a target number of feature points to be detected is set, and feature points are detected. FIG. 7 illustrates a state in which an image is divided in a grid pattern. The shading indicates an in-focus area, and the white portion indicates an out-of-focus area.

When feature point detection is performed while setting a target number of feature points for each divided image, feature points can be detected uniformly from the entire screen. However, if an image with a shallow depth of field is divided and processed without using the present method, blur is significant in an out-of-focus area, and it is difficult to detect feature points from the corresponding divided image area. The use of the present method together with image division makes it possible to detect feature points even from a blurred area and to detect a number of feature points that is close to the target number of feature points while detecting feature points uniformly from the screen.

Although an example in which resolution conversion processing for reducing an image is performed as the image conversion processing is described in this embodiment, enlargement processing may also be performed. The enlargement changes the characteristics of an image, and thus increases the possibility that a feature point that cannot be detected from an original-size image can be detected. Also, detection of a feature point from an enlarged image has an advantage that the precision of the coordinates of the feature point is improved. Feature points may also be detected from both an enlarged image and a reduced image.

In this embodiment, with regard to the high-score extraction method, the smallest score value is searched for, and that element is replaced one after another. However, the present invention is not limited to this. For example, sorting may also be performed every time to obtain the smallest value.

In this embodiment, an example in which processing for detecting feature points from an image is executed based on the control of the CPU 1005 is described. However, it is also possible that a plurality of detection apparatuses are provided for a plurality of reduced images, respectively, and the detection apparatuses individually detect feature points.

Now, a second embodiment of the present invention will be described. According to this embodiment, in feature point detection processing, the feature point detection and the target value setting for each converted image are processed by different loops. According to this embodiment, feature point detection processing of a converted image does not depend on the results of feature point detection processing of an image before the conversion, and therefore feature point detection processing of a plurality of images can be executed in parallel. It should be noted that the operation and configuration of this embodiment are mostly the same as those of the first embodiment, and so the differences from the first embodiment will be mainly described.

Feature Point Detection Processing

Hereinafter, specific processing of feature point detection processing will be described with reference to FIG. 8. FIG. 8 is a flow diagram for explaining feature point detection processing according to this embodiment.

In this embodiment, by way of example, reduced images are generated from an input image with scaling factor parameters $s[1]=\frac{1}{4}$, $s[2]=\frac{1}{16}$, and $s[3]=\frac{1}{256}$, respectively, and processing is performed.

In step S2010, the control variable "i" is initialized to 0. In step S2020, an image serving as a feature point detection target is input. Hereinafter, the input image is referred to as the image [0]. In step S2030, the target number of feature points to be detected is set to the variable dmax.

In step S2040, with respect to an image [i], feature point detection processing for each pixel illustrated by the flow in FIG. 3 is executed as a subroutine, and feature points are detected, where dmax is the upper limit number of feature points to be detected. In step S2040, a temporary array that is a two-dimensional array is used. The temporary array is composed of four variable-length arrays, and a variable-length array of the image [i] is referred to as a temporary array [i]. The address of the temporary array [i] and dmax, which is the target number, are set to the subroutine. Also, the number of feature points that have been detected is received as a return value, and substituted for the variable d[i]. The descriptions of feature point detection processing for each pixel and high-score extraction processing, which is the subroutine of feature point detection processing for each pixel, are the same as those of the first embodiment, and are not described in detail here.

In step S2050, "i" is incremented by 1. In step S2060, it is judged whether or not "i" is larger than the number of scales. If "i" is larger than the number of scales (YES in step S2060), the subroutine proceeds to step S2080, and if not (No in step S2060), the subroutine proceeds to step S2070. Here, in step S2050, it is judged whether "i" is larger than 4, which is the number of scales. When feature point detection processing of an image [3] has been performed in step S2040, and the control variable "i" has been incremented to 4 in step S2050, the result of judgement in step S2050 is YES.

In step S2070, an image that has been reduced with a scaling factor parameter s[i] is obtained. After that, the subroutine proceeds to step S2040, and the loop process is repeated. It should be noted that the loop process can also be performed in parallel. That is to say, feature point detection processing with respect to the image [0] to the image [3] can also be performed in parallel.

In step S2080, the control variable "i" is initialized to 0. In step S2090, dmax and d[i] are compared in terms of magnitude, and the smaller value is substituted for "d". Here, dmax is the target value of feature point detection. The variable d[i] is the number of feature points with respect to the image [i]. That is to say, min(dmax, d[i]) is substituted for "d". In step S2100, "d" feature points that are detected from the feature point information stored in the temporary array [i] in the order of the highest score are stored in a memory area in the RAM 1002, the memory area being sharable with other programs. In step S2110, dmax−d is computed and substituted for dmax. The new dmax value is used in the judgement of whether the loop is ended and in the next loop process. Now, dmax is a new target value of feature point detection.

In step S2120, "i" is incremented by 1. In step S2130, it is judged whether dmax=0 or whether "i" is larger than the number of scales. If at least either of these conditions is met (YES in step S2130), the processing is ended, and if not (No in step S2130), the processing proceeds to step S2090. After that, the loop process is repeated until the processing is ended.

According to this embodiment, the same effects as the first embodiment can be achieved. Also, the processing is divided into a feature point detection phase of steps S2010 to S2070 and a high-score feature point extraction phase of steps S2080 to S2130. In the feature point detection phase, dmax is fixed, and therefore there is no dependence between loop processes for respective reduced images. Thus, while feature point detection processing for each pixel with respect to a reduced image at a certain scale is not finished (step S2040), feature point detection processing for each pixel with respect to the next reduced image can be performed. Therefore, according to this embodiment, feature point detection processing with respect to different reduced images can be executed in parallel.

Also, a program that uses a feature point, for example, feature amount calculation processing of a feature amount calculation program and the high-score feature point extraction phase can also be executed in parallel. In this case, feature amounts of all of the feature points obtained in the feature point detection phase are calculated, and after the end of the high-score feature point extraction phase, low-score feature points in extraction processing and the feature amounts of those feature points are discarded. With this configuration, the target number of feature points and the feature amounts of those feature points can be extracted in such a manner that priority is given to the original-size image.

Now, a third embodiment of the present invention will be described. According to this embodiment, in feature point detection processing, filtering for noise reduction is used as the image conversion processing. It should be noted that the operation and configuration of this embodiment are mostly the same as those of the first embodiment, and so the configuration that is specific to this embodiment will be mainly described.

Feature Point Detection Processing

In this embodiment, an example in which images obtained by applying noise reduction processing with three levels of noise reduction parameters $s[1]=10$, $s[2]=20$, and $s[3]=30$ to an input image are handled will be described. It should be noted that the number of images to be processed and the parameter are not limited to this example.

Hereinafter, specific processing of feature point detection processing will be described with reference to FIG. 2. In step S1070 of FIG. 2, according to the first embodiment, a reduced image [i] that has been reduced with a parameter s[i] is obtained. According to this embodiment, instead of obtaining a reduced image, an image to which noise reduction processing with an $\epsilon$ filter has been applied is obtained using s[i] as an $\epsilon$ parameter.

There is no limitation on the obtaining method, and noise reduction processing may be generated in this step, or an image to which noise reduction processing has been applied in advance may be input. Also, in the case where a processed image to which noise reduction processing has been applied in advance is input and obtained, the processed image may be the image obtained by applying noise reduction processing with different filter coefficients to the input image. Alternatively, an image obtained by multiply applying noise reduction processing with the same filter coefficient to the input image may also be obtained as the processed image.

Depending on the feature point detection method, it is difficult to detect feature points from an image that has noise. In addition, in many cases, an increase in the effect of noise reduction processing leads to an increase in the extent to which the image is blurred. If an image is blurred to a significant extent, feature point detection is difficult. According to this embodiment, if an input image has much noise, and a sufficient number of feature points cannot be detected, feature points are detected from a noise-reduced image, and thus a number of feature points that is close to the preset target number of feature points to be detected can be detected. Also, the risk that the extent of blur may become too large for any feature point to be found is reduced by successively performing noise reduction.

In this embodiment, an example in which an image to which noise reduction processing has been applied is obtained in accordance with the flow in FIG. 2 is described. However, the present invention is not limited to this. Processing may also be performed in accordance with the flow in FIG. 8. Also, filtering is not limited to the ε filter and may also be performed using other filters such as a Gaussian filter, a median filter, etc.

Now, a fourth embodiment of the present invention will be described. According to this embodiment, in feature point detection processing, tone conversion processing, for example, gamma conversion processing is used as the image conversion processing. It should be noted that the operation and configuration of this embodiment are mostly the same as those of the first embodiment, and so the configuration that is specific to this embodiment will be mainly described.
Feature Point Detection Processing In this embodiment, gamma conversion processing with gamma conversion parameters s[1]=1.2 and s[2]=0.8 is applied to an input image. That is to say, processing is performed with respect to three images including the input image to which gamma conversion is not applied. It should be noted that the number of images to be processed and the parameter are not limited to those described above.

Hereinafter, specific processing of feature point detection processing will be described with reference to FIG. 2. In step S1070 of FIG. 2, according to the first embodiment, an image [i] that has been reduced with a parameter s[i] is obtained. According to this embodiment, instead of obtaining a reduced image, an image to which gamma conversion processing has been applied is obtained using s[i] as a gamma value. It should be noted that there is no limitation on the method for obtaining an image, and an image to which gamma conversion processing has been applied may be generated in this step, or a configuration in which an image that has been generated in advance is input may be adopted.

Generally, it is difficult to detect feature points from a low-contrast image. When gamma conversion is applied, the contrast in a particular luminance range is improved. That is to say, an image having different contrast characteristics can be generated. According to this embodiment, if an input image has a low contrast, and a sufficient number of feature points cannot be detected, feature points are detected from an image to which gamma conversion has been applied, and thus it is easy to detect feature points. Consequently, a number of feature points that is close to the preset target number can be detected by totaling the numbers of feature points detected from a plurality of images.

In this embodiment, an example in which an image to which gamma conversion image processing has been applied is obtained in accordance with the flow in FIG. 2 is described. However, the present invention is not limited to this. The processing may also be performed in accordance with the flow in FIG. 8. Also, the image conversion processing is not limited to gamma conversion image processing, and tone correction by means of gain or offset adjustment may also be performed. The same effects as those in the case of an image to which gamma conversion has been applied can be achieved by detecting feature points from an image to which gain or offset adjustment has been applied.

Now, a fifth embodiment of the present invention will be described. According to this embodiment, in feature point detection processing, an upper limit value is set in target number computation. It should be noted that the operation and configuration of this embodiment are mostly the same as those of the first embodiment, and so the configuration that is specific to this embodiment will be mainly described.
Feature Point Detection Processing Hereinafter, specific processing of feature point detection processing will be described with reference to FIG. 2. As in the case of the first embodiment, reduced images are generated by reducing an input image with scaling factor parameters s[1]=¼, s[2]=¹⁄₁₆, and s[3]=¹⁄₂₅₆, respectively, and processing is performed.

In step S1080 of FIG. 2, according to the first embodiment, dmax−d is computed and substituted for dmax. According to this embodiment, instead of computing dmax−d, min(dmax−d, max[i]) is computed and substituted for dmax. As described above, the function min(x, y) compares the two arguments "x" and "y" in terms of magnitude and returns the smaller value as a return value. Here, "d" is the number of feature points detected in feature point detection processing. Also, max[i] is a preset upper limit of the number of feature points to be detected with respect to an i-th scale. For example, when the image size is indicated in the number of pixels, max[i] can be calculated by an equation max[i]=(k/100)×size×s[i], where "size" is the number of pixels, and the detection upper limit is k % of the image size. In this embodiment, it is assumed that k=0.05.

In this embodiment, if the value of dmax−d is larger than max[i], the next target value is set at max[i]. In this manner, according to this embodiment, an upper limit of the number of feature points to be detected can be set for each reduced image in accordance with the resolution, and therefore unnecessary feature points can be suppressed. It should be noted that in this embodiment, an example in which a reduced image is obtained in step S1070 is described; however, as in the third or fourth embodiment, a configuration can also be adopted in which an image to which filtering or tone conversion processing has been applied is obtained. In this case, the same effects as those of the third or fourth embodiment can be achieved.

Now, a sixth embodiment of the present invention will be described. According to this embodiment, in feature point detection processing, a lower limit value is set in target number computation. It should be noted that the operation and configuration of this embodiment are mostly the same as those of the first embodiment, and so the configuration that is specific to this embodiment will be mainly described.
Feature Point Detection Processing Hereinafter, a specific operation of feature point detection processing will be described with reference to FIG. 2. As in the case of the first embodiment, reduced images are generated by reducing an input image with scaling factor parameters s[1]=¼, s[2]=¹⁄₁₆, and s[3]=¹⁄₂₅₆, respectively, and processing is performed.

In step S1080 of FIG. 2, according to the first embodiment, dmax−d is computed and substituted for dmax. According to this embodiment, instead of computing dmax−d, max(dmax−d, dmin) is computed and substituted for dmax. A function max(x, y) compares the two arguments "x" and "y" in terms of magnitude and returns the larger value as a return value. Here, "d" is the number of feature points detected in feature point detection processing. Also, dmin is a preset lower limit of the number of feature point to be detected from the input image or a reduced image. In this embodiment, if the value of dmax−d is smaller than dmin, the next target value is set at dmin. In this embodiment, it is assumed that dmin=100.

The results of feature point detection can be used in various applications such as shake correction, image retrieval, image recognition, etc. Therefore, to detect and save feature points having as diverse characteristics as possible increases the versatility of the results of feature point detection. Feature points detected from images of different resolutions have different characteristics. In this embodiment, a lower limit value of the target is set for each reduced image, and thus the minimum number of feature points required can be detected even from a reduced image. This means that the processing that uses the results of feature point detection can use feature points having more diverse characteristics. In various types of such processing, feature points can be selected and used as appropriate for each type of processing.

In this embodiment, an example in which a reduced image is obtained in step S1070 is described. However, as in the third or fourth embodiment, a configuration can also be adopted in which an image to which filtering or tone conversion processing has been applied is obtained. Thus, the same effects as those of the third or fourth embodiment can be achieved.

In the first to sixth embodiments, an example in which feature point detection processing is performed within a PC has been described. In another embodiment below, an example in which feature point detection processing is performed in an apparatus other than a PC will be described. In this embodiment, in particular, a camera apparatus having feature point detection functionality will be described as an example. It should be noted that the operation and configuration of this embodiment are mostly the same as those of the second embodiment, and so the configuration that is specific to this embodiment will be mainly described.

Configuration of Camera Apparatus

Figure 1B:
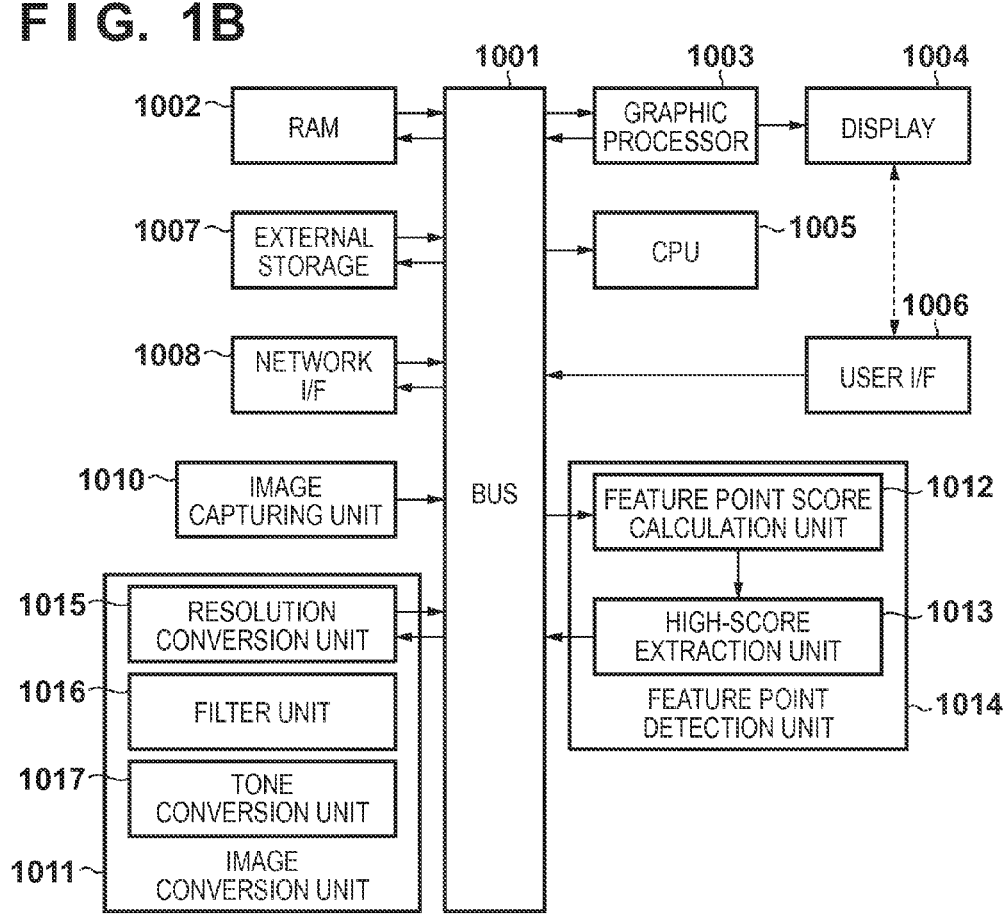

FIG. 1B is a diagram for explaining the configuration of a camera apparatus. The configuration and operation of the camera apparatus in FIG. 1B are mostly equivalent to those in FIG. 1A. However, in FIG. 1B, an image capturing unit 1010 configured to perform image capturing and to obtain an image is added instead of the external image capturing unit 1009 in FIG. 1A. The image capturing unit 1010 is constituted by a sensor and a circuit that converts a sensor image into a digital image. A captured image that has been captured and obtained by the image capturing unit 1010 is saved to the RAM 1002.

Furthermore, in the camera apparatus, a feature point detection unit 1014 and an image conversion unit 1011 are added as compared with the PC. The feature point detection unit 1014 is a component that detects feature points from the captured image that has been obtained by the image capturing unit 1010. The image conversion unit 1011 is a component that applies image processing such as resolution conversion, noise reduction, tone conversion, etc. to the captured image.

The feature point detection unit 1014 contains a feature point score calculation unit 1012 that calculates a score for each pixel constituting the captured image and a high-score extraction unit 1013 that extracts pixels having high scores as feature points. The image conversion unit 1011 contains a resolution conversion unit 1015, a filter unit 1016, and a tone conversion unit 1017.

The resolution conversion unit 1015 is a component that converts the resolution of the captured image. The filter unit 1016 is a component that performs filtering for applying noise reduction to the captured image. The tone conversion unit 1017 is a component that converts the tone of the captured image. In the foregoing embodiments in which a PC is used, the above-described configuration is attained by the CPU 1005 controlling the operation of the hardware resources based on a program. However, in this embodiment, an example in which the above-described configuration is attained by a dedicated circuit will be described.

It should be noted that like the foregoing embodiments, the camera apparatus has the bus 1001, the RAM 1002, the graphic processor 1003, the display 1004, the CPU 1005, the user I/F 1006, the external storage 1007, and the network I/F 1008. The functions of these components are the same as those of the foregoing embodiments.

Feature Point Detection Processing

Within this camera apparatus, the flow in FIG. 8 described in the second embodiment is executed. However, the processing in step S2040, which was executed by the CPU 1005, is performed by the feature point score calculation unit 1012 contained in the feature point detection unit 1014. Also, the processing executed in step S2110 is performed by the high-score extraction unit 1013. The other processing is executed by the CPU 1005. However, in this embodiment, before execution of the flow in FIG. 8, the image conversion unit 1011 generates a reduced image using the resolution conversion unit 1015.

Hereinafter, the operation of the circuit that is added will be described. The resolution conversion unit 1015 generates a reduced image. Specifically, a captured image saved to the RAM 1002 is read out and reduced, and the resultant reduced image is saved to the RAM 1002. Examples of the reduction algorithm include a bilinear method, a bicubic method, etc.

The feature point score calculation unit 1012 is a circuit that reads out pixels in a raster order from the captured image, or the reduced image, saved to the RAM 1002 and calculates a feature point score for each pixel. If the calculated feature point score is larger than a threshold, that score is output to the high-score extraction unit 1013 together with feature point coordinate information.

The high-score extraction unit 1013 is a circuit that extracts only the number of feature points having high scores that is set by the target number. The CPU 1005, in step S2110 of FIG. 8, computes dmax−d as described in the first embodiment with reference to step S1080 of FIG. 2, and sets the computation result as the target number dmax. However, there is no limitation on the formula for calculating the upper limit number, and a formula described in the fifth or sixth embodiment, that is, min(dmax−d, max[i]) or max(dmax−d, dmin) can also be used.

Based on the feature point scores output from the feature point score calculation unit 1012, the high-score extraction unit 1013 extracts only the feature point information of the target number of feature points in the order of the highest feature point score. This processing is the same as high-score extraction processing, which has been described in the first embodiment with reference to FIG. 5. Also, at the time point when processing with respect to all of the pixels in the image is ended, the feature point information that is held by the high-score extraction unit 1013 is saved to the RAM 1002 in the format of a variable-length array, which has been described in the first embodiment with reference to FIG. 4. The saved feature point information is used in other processing modules.

The CPU 1005 receives an image capturing instruction signal that is generated by the user I/F 1006 in accordance with a user instruction. At this time, the CPU 1005 controls the image capturing unit 1010 to capture an image. Also, the CPU 1005 controls the image conversion unit 1011, the feature point score calculation unit 1012, and the high-score extraction unit 1013 to detect feature points from the captured image and the reduced image.

Feature point detection can be applied to, for example, camera shake correction processing for a moving image. The moving amounts of feature points can be calculated by continuously detecting feature points from a moving image and matching the feature points between the images. The moving amount of the entire screen is obtained from the moving amounts of the individual feature points, and geometric conversion is performed such that the obtained moving amount is corrected. Thus, the shake correction can be performed.

It should be noted that in this embodiment, an example in which the high-score extraction unit 1013 extracts feature points having high feature point scores is described; however, the present invention is not limited to this, and this processing may also be performed by the CPU 1005. Also, although an example in which image conversion is performed by the image conversion unit 1011 is described, image conversion may also be performed by the CPU 1005.

In this embodiment, an example in which the entire image is processed at one time is described. However, the present invention is not limited to this. For example, as shown in FIG. 7, it is also possible to divide an image in a grid pattern, thereby generating divided images, set a target number of feature points to be detected for each divided image, and detect feature points from the divided images. It is also possible to provide a plurality of feature point detection units and make the different feature point detection units detect feature points from different divided images.

In the description of this embodiment, it is assumed that processing is performed in accordance with the flow in FIG. 8. However, there is no limitation on the flow, and processing may also be performed in accordance with the flow in FIG. 2. Also, an example in which the image conversion unit 1011 reduces an image using the resolution conversion unit 1015 is described herein. However, the filter unit 1016 of the image conversion unit is capable of executing ∈ filtering, thereby generating a noise-reduced image and saving the image to the RAM 1002. Also, the tone conversion unit 1017 is capable of performing gamma conversion, gain adjustment, and offset adjustment, and can save the processed image to the RAM 1002.

The use of these functions also enables the flow described in the third or fourth embodiment to be executed and the filter unit 1016 to perform filtering or the tone conversion unit 1017 to perform gamma conversion processing. As a result, the same effects as those of the third or fourth embodiment can be achieved.

As described above, with the above-described configuration, if a set target number of feature points cannot be detected from an input image, feature points corresponding to the deficit are detected using the same feature point detector from an image into which the input image is converted. Thus, even if it is difficult to detect sufficient and appropriate feature points from an input image itself as in the case where feature points are to be detected from an image, such as a blurred image, from which it is difficult to detect feature points, a number of feature points that is closer to the target number of feature points can be detected. Accordingly, the performance of processing that is executed using the results of the obtained feature points can be improved.

Other Embodiments

Embodiments of the present invention can also be attained by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131062, filed Jun. 21, 2013, which is hereby incorporated by reference herein in its entirety.

What is claimed is:

1. A detection apparatus that detects a feature point of an image, comprising:
   one or more processors; and
   a memory coupled to the one or more processors and storing instructions which, when executed by the one or more processors, cause the one or more processors to:
   control an image conversion to convert a first image into a second image;
   set a first target number indicating a number of feature points to be detected from the first image by first detection processing and to set, in a case where a difference between the first target number and a number of feature points detected from the first image by the first detection processing is less than a predetermined number, a number that is more than the difference between the first target number and the number of feature points detected from the first image, as a second target number indicating a number of feature points to be detected from the second image by second detection processing; and
   control the first detection processing for detecting feature points from the first image based on the first target number and the second detection processing for detecting feature points from the second image based on the second target number.

2. The apparatus according to claim 1,
wherein the instructions further cause the one or more processors to determine whether or not individual pixels contained in the first image and the second image are feature points based on scores of the respective pixels, the scores depending on properties of the pixels, and a predetermined threshold.

3. The apparatus according to claim 1,
wherein the first detection processing and the second detection processing are performed for detecting a feature point based on an order of magnitude of scores of individual pixels contained in the first image and the second image, the scores depending on properties of the respective pixels.

4. The apparatus according to claim 1,
wherein a third image corresponding to the first image is generated, a third target number indicating the number of feature points to be detected from the third image is set based on the number of feature points that are detected from the second image, and processing for detecting a feature point from the third image is performed based on the third target number.

5. The apparatus according to claim 1,
wherein the first detection processing for detecting a feature point from the first image is performed based on the first target number, and the second detection processing for detecting a feature point from the second image is performed based on the second target number.

6. The apparatus according to claim 1, wherein the instructions further cause the one or more processors to set, in a case where the difference between the first target number and the number of feature points detected from the first image by the first detection processing is equal to or more than the predetermined number, the difference between the first target number and the number of feature points detected from the first image, as the second target number indicating the number of feature points to be detected from the second image by the second detection processing.

7. A detection apparatus that detects a feature point of an image, comprising:
one or more processors; and
a memory coupled to the one or more processors and storing instructions which, when executed by the one or more processors, causes the one or more processors to:
control an image conversion to convert a first image into a second image;
set a first target number indicating a number of feature points to be detected from the first image by first detection processing and set, in a case where a difference between the first target number and a number of feature points detected from the first image by the first detection processing is less than a predetermined number, a number that is more than the difference between the first target number and the number of feature points detected from the first image, as a second target number indicating a number of feature points to be detected from the second image by second detection processing;
control the first detection processing and the second detection processing for detecting feature points from the first image and the second image; and
obtain the second target number of feature points out of feature points that are detected from the second image by the second detection processing.

8. The apparatus according to claim 7,
wherein the first detection processing for detecting feature points from the first image and a the second detection processing for detecting feature points from the second image are performed, and the second target number of feature points out of feature points that are detected from the second image is performed.

9. The apparatus according to claim 7, wherein the instructions further cause the one or more processors to set, in a case where the difference between the first target number and the number of feature points detected from the first image by the first detection processing is equal to or more than the predetermined number, the difference between the first target number and the number of feature points detected from the first image, as the second target number indicating the number of feature points to be detected from the second image by the second detection processing.

10. A detection method of a detection apparatus that detects a feature point from a first image and a second image into which the first image is converted, the method comprising:
setting a first target number indicating a number of feature points to be detected from the first image by first detection processing;
performing the first detection processing for detecting feature points from the first image based on the first target number;
setting, in a case where a difference between the first target number and a number of feature points detected from the first image by the first detection processing is less than a predetermined number, a number that is more than the difference between the first target number and the number of feature points detected from the first image, as a second target number indicating a number of feature points to be detected from the second image by second detection processing; and
performing the second detection processing for detecting feature points from the second image based on the second target number.

11. The method according to claim 10, further comprising:
generating a third image corresponding to the first image;
setting a third target number indicating a number of feature points to be detected from the third image based on the number of feature points that are detected from the second image; and
detecting a feature point from the third image based on the third target number.

12. The method according to claim 10, wherein in a case where the difference between the first target number and the number of feature points detected from the first image by the first detection processing is equal to or more than the predetermined number, the difference between the first target number and the number of feature points detected from the first image is set, as the second target number indicating the number of feature points to be detected from the second image by the second detection processing.

13. A detection method of a detection apparatus that detects a feature point from a first image and a second image into which the first image is converted, the method comprising:
setting a first target number indicating a number of feature points to be detected from the first image by first detection processing;
performing the first detection processing for detecting feature points from the first image;
performing second detection processing for detecting feature points from the second image;
setting, in a case where a difference between the first target number and a number of feature points detected from the first image by the first detection processing is less than a predetermined number, a number that is more than the difference between the first target number and the number of feature points detected from the first image, as a second target number indicating a number of feature points to be detected from the second image by the second detection processing; and obtaining the second target number of feature points out of feature points that are detected from the second image by the second detection processing.

14. The method according to claim 13, wherein in a case where the difference between the first target number and the number of feature points detected from the first image by the first detection processing is equal to or more than the predetermined number, the difference between the first target number and the number of feature points detected from the first image is set, as the second target number indicating the number of feature points to be detected from the second image by the second detection processing.

15. A non-transitory storage medium storing a computer program for detecting a feature point from a first image and a second image into which the first image is converted, the computer program comprising:

setting a first target number indicating a number of feature points to be detected from the first image by first detection processing;

performing the first detection processing for detecting feature points from the first image based on the first target number;

setting, in a case where a difference between the first target number and a number of feature points detected from the first image by the first detection processing is less than a predetermined number, a number that is more than the difference between the first target number and the number of feature points detected from the first image, as a second target number indicating a number of feature points to be detected from the second image by second detection processing; and performing the second detection processing for detecting feature points from the second image based on the second target number.

16. The non-transitory storage medium according to claim 15, wherein the computer program further comprises:

generating a third image corresponding to the first image;

setting a third target number indicating a number of feature points to be detected from the third image based on the number of feature points that are detected from the second image; and detecting feature points from the third image based on the third target number.

17. The non-transitory storage medium according to claim 15, wherein in a case where the difference between the first target number and the number of feature points detected from the first image by the first detection processing is equal to or more than the predetermined number, the difference between the first target number and the number of feature points detected from the first image is set, as the second target number indicating the number of feature points to be detected from the second image by the second detection processing.

18. A non-transitory storage medium storing a computer program for detecting a feature point from a first image and a second image into which the first image is converted, the computer program comprising:

setting a first target number indicating a number of feature points to be detected from the first image by first detection processing;

performing the first detection processing for detecting feature points from the first image;

performing second detection processing for detecting feature points from the second image;

setting, in a case where a difference between the first target number and a number of feature points detected from the first image by the first detection processing is less than a predetermined number, a number that is more than the difference between the first target number and the number of feature points detected from the first image, as a second target number indicating a number of feature points to be detected from the second image by the second detection processing; and obtaining the second target number of feature points out of feature points that are detected from the second image by the second detection processing.

19. The non-transitory storage medium according to claim 18, wherein in a case where the difference between the first target number and the number of feature points detected from the first image by the first detection processing is equal to or more than the predetermined number, the difference between the first target number and the number of feature points detected from the first image is set, as the second target number indicating the number of feature points to be detected from the second image by the second detection processing.

* * * * *